United States Patent
Takiguchi et al.

(10) Patent No.: US 6,947,643 B2
(45) Date of Patent: Sep. 20, 2005

(54) OPTICAL CONTROL UNIT AND FORMING METHOD THEREFOR

(75) Inventors: Yoshihiro Takiguchi, Hamamatsu (JP); Kensaku Itoh, Fuchu-machi (JP)

(73) Assignee: Hamamatsu Photonics K.K., Shizuoka (JP)

( * ) Notice: Subject to any disclaimer, the term of this patent is extended or adjusted under 35 U.S.C. 154(b) by 82 days.

(21) Appl. No.: 10/480,459

(22) PCT Filed: Jun. 14, 2002

(86) PCT No.: PCT/JP02/05980

§ 371 (c)(1),
(2), (4) Date: Dec. 12, 2003

(87) PCT Pub. No.: WO02/103439

PCT Pub. Date: Dec. 27, 2002

(65) Prior Publication Data

US 2004/0170357 A1 Sep. 2, 2004

(30) Foreign Application Priority Data

Jun. 15, 2001 (JP) .................................... 2001-181854

(51) Int. Cl.[7] ............................. G02B 6/26; G02B 6/02; G02B 6/10
(52) U.S. Cl. .......................... 385/39; 385/125; 385/131
(58) Field of Search ............................ 385/39, 123–132

(56) References Cited

U.S. PATENT DOCUMENTS 6,075,915 A   6/2000  Koops et al.
6,093,246 A * 7/2000  Lin et al. ............................. 1/1
6,798,960 B2 * 9/2004  Hamada ....................... 385/122

FOREIGN PATENT DOCUMENTS

JP        2000-121987         4/2000

OTHER PUBLICATIONS

Gu et al., Photochemically Tunable Colloidal Crystals, *J. Am. Chem. Soc.* 2000, vol. 122, pp. 12387–12388.
Ballato, Tailoring Visible Photonic Bandgaps Through Microstructural Order and Coupled Material Effects in $SiO_2$ Colloidal Crystals, J. Opt. Soc. Am. B, vol. 17, No. 2, Feb. 2000, pp. 219–225.
Vos et al., Strong Effects of Photonic Band Structures on the Diffraction of Colloidal Crystals, Physical Review B, vol. 53, No. 24, Jun. 15, 1996, pp. 16231–16235.

* cited by examiner

*Primary Examiner*—John D. Lee
*Assistant Examiner*—Tina M. Lin
(74) *Attorney, Agent, or Firm*—Morgan Lewis & Bockius LLP

(57) ABSTRACT

An end face 7a of an optical fiber 7 and an end face 8a of an optical fiber 8 are arranged so as to have a predetermined interval and to oppose each other in a V-groove 23 of a base 21. A solution 27 including particles used as a material of the photonic crystal is dropped into a space section 25 which is formed by the end face 7a, the end face 8a, and the V-groove 23. Accordingly, by growing the photonic crystal from each of the end face 7a and the end face 8a, the optical control section including the photonic crystal 2 is formed on each of the end face 7a and the end face 8a.

12 Claims, 8 Drawing Sheets

OPTICAL CONTROL UNIT AND FORMING METHOD THEREFOR

TECHNICAL FIELD

The present invention relates to an optical control section including a photonic crystal, and a method for forming the same.

BACKGROUND ART

A photonic crystal means a new crystal, which generally has a periodic refractive index change of the same degree as a wave length of light therein, such as a three-dimensional photonic crystal with a three-dimensional refractive index distribution, a two-dimensional photonic crystal with a two-dimensional refractive index distribution and the like. Such a structure has a feature, similar to a case where electrons (electronic wave) are reflected by means of Bragg reflection according to a periodic potential of an atomic nucleous in a semiconductor resulting in forming a band gap, that a light wave is reflected by means of the Bragg reflection according to a periodic refractive index distribution resulting in forming a band gap (photonic band gap) to the light. For this reason, recently, research-and-development for using the photonic crystal as an optical control has been ongoing.

DISCLOSURE OF THE INVENTION

As the above optical control, a control, such as a selection, a transmission method or the like of a wavelength of light emitted from and inputted into an optical fiber by arranging a photonic crystal on an end face of the optical fiber, can be considered. As a method for arranging the photonic crystal on the end face of the optical fiber, a method for directly forming the photonic crystal on the end face of the optical fiber, for example, by lithography can be considered. However, this method requires expensive equipment for manufacturing the photonic crystal, and in addition, requires significant time for manufacturing the photonic crystal.

As other methods for arranging the photonic crystal on the end face of the optical fiber, there is a method wherein the photonic crystal is separately made using fine balls, such as polystyrene, these are cut out so that they may have a predetermined size and the cut-out surface may have a predetermined direction, and the cut-out photonic crystal is then arranged on the end face of the optical fiber. However, this method requires cutting out the photonic crystal so that the photonic crystal may have a predetermined wavelength selectivity, and this requires considerable skill.

The object of the present invention is to provide a method for forming an optical control section including a photonic crystal on an optical transmission line such as an optical fiber with ease, and the optical control section which is formed by this method.

A method according to the present invention is to form an optical control section, which controls at least either light inputted into or light emitted from an optical transmission line, on the optical transmission line including an end face which becomes at least either an incident plane or an emitting plane of the light, wherein the optical control section including a photonic crystal is formed on the end face, by putting a solution including particles used as a material of the photonic crystal into a space section in which the end face is positioned, and growing the photonic crystal on the end face.

According to the present invention, by putting the solution including the particles into the space section, and growing the photonic crystal on the end face of the optical transmission line, the optical control section is formed on the end face. Therefore, according to the present invention, the photonic crystal used as the optical control section can be formed on the end face of the optical transmission line with ease.

Moreover, the optical transmission line may be, for example, an optical fiber or a light confinement-type optical waveguide. The optical transmission line may consist of, for example, an insulating transparent substrate (it consists of glass, quartz, lithium niobic acid or the like) or an optical crystal. The control may be, for example, a wavelength selection or an optical transmission property modulation.

According to the present invention, while growing the photonic crystal on the end face, an optical property of the photonic crystal can be measured. Thereby, this makes it possible to obtain information on the optical property of the photonic crystal in real time during growth of the photonic crystal. The optical property may be, for example, a wavelength transparency or a reflection property.

According to the present invention, when it is judged that the photonic crystal has a predetermined optical property based on the measurement, by irradiating light with a predetermined wavelength to the solution, and making the solution gel, a semi-solidified optical control section with plasticity can be formed on the end face. Thereby, this makes it possible to reliably form the optical control section, which has the predetermined optical property, on the end face of the optical transmission line.

According to the present invention, by making the solution gel, the semi-solidified optical control section with plasticity can be formed on the end face. Thereby, this makes it possible to form the optical control section, in which the optical property changes by making a force act on the photonic crystal.

According to the present invention, by leaving the solution of the space section, and making the particles arrange naturally, the photonic crystal can be grown on the end face.

According to the present invention, by charging static electricity to the particles in the solution, and a balance between gravity which acts on the particles and an electrostatic force among particles, at least either a growth direction or a growth rate of the photonic crystal, which is grown on the end face, can be controlled.

According to the present invention, it may be configured that at least either on the end face or in the optical transmission line in its vicinity, at least either a charge layer or a fine structure layer in order to grow the photonic crystal stably is formed.

According to the present invention, by applying vibration to the end face when pouring the solution into the space section, the photonic crystal can be grown on the end face after dispersing the particles.

According to the present invention, by forming the space section by arranging the end face of one optical transmission line and an end face of the other optical transmission line in parallel to each other, and growing the photonic crystal on the end face of the other optical transmission line in addition to the end face of one optical transmission line, the photonic crystal, which connects the end face of the other optical transmission line to the end face of one optical transmission line, can be formed.

According to the present invention, by tilting the end face of the optical transmission line to an optical axis of the optical transmission line and inclining the end face of the other optical transmission line to an optical axis of the other optical transmission line, and making a growth axis of the photonic crystal to be at a predetermined angle to each of the optical axes, the photonic crystal can be made so as to have a predetermined optical property.

According to the present invention, the solution can be poured into the space section after arranging a spacer which specifies the space section.

The present invention is an optical control section formed by the method of the present invention described above.

BEST MODE FOR CARRYING OUT THE INVENTION

Preferred embodiments according to the present invention are described in detail using the drawings. By giving the same symbol to a similar component in the figures, overlapping description is omitted.

[Optical Control Section Including Photonic Crystal]

Figure 1:
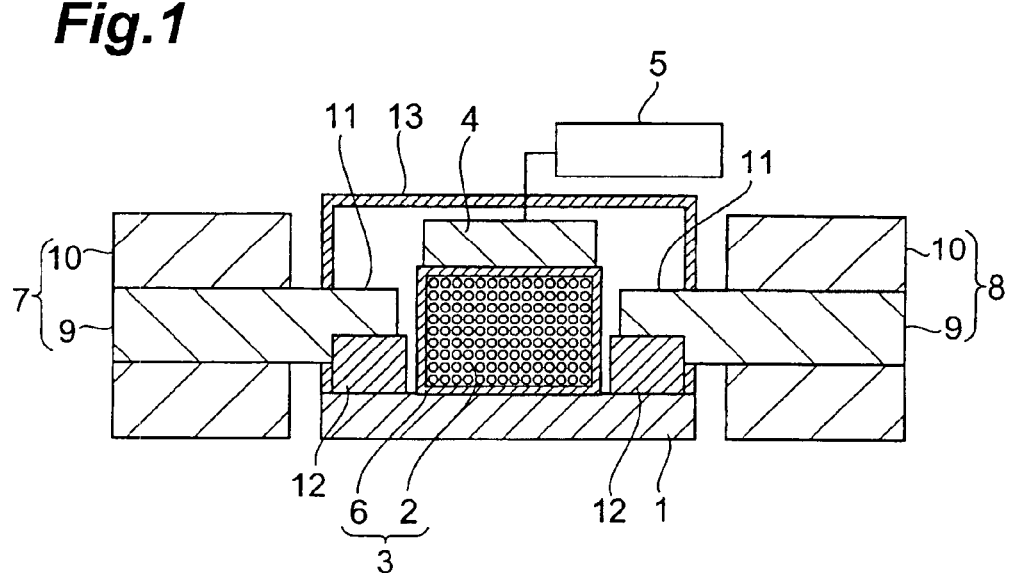
FIG. 1 is a schematic block diagram when an optical control section including a photonic crystal is used as a wavelength selection device.

First, an optical control section including a photonic crystal which will be a prerequisite for this embodiment is described. FIG. 1 is a schematic block diagram when the optical control section including the photonic crystal is used as a wavelength selection device. The wavelength selection device shown in FIG. 1 includes a base 1, an optical control section 3 including a photonic crystal 2 with plasticity, which is installed on the base 1, a piezo-electric element 4 which applies an external force to the photonic crystal 2 (increases or decreases the external force), and a driving power supply 5 which controls the piezo-electric element 4 with desirable accuracy.

The optical control section 3 includes a film 6, which is formed so as to cover a surface of the photonic crystal 2. Since the photonic crystal 2 is gel, it contains moisture. The film 6 prevents this moisture from evaporation. An optical fiber 7 is arranged at the input side of the optical control section 3, and an optical fiber 8 is arranged at the output side thereof. Each of optical fibers 7 and 8 contains a core section 9 and a cladding layer 10 arranged around the perimeter thereof. In each of the optical fibers 7 and 8, the cladding layer 10 around a top section 11 is removed by a predetermined length from an end face of the core section 9. The top section 11 is arranged on a positioning stand 12 arranged on the base 1 so that each core section 9 of the optical fibers 7 and 8 may be opposed to the photonic crystal 2. A case 13 is attached to the base 1, and the optical control section 3, the piezo-electric element 4, and the top section 11 are positioned in the space which is formed by the base 1 and the case 13.

In the wavelength selection device of FIG. 1, an external force applied to the photonic crystal 2 of the optical control section 3 can make a wavelength of light, which is transmitted to the optical fiber 8 from the optical fiber 7, variable.

Figure 2:
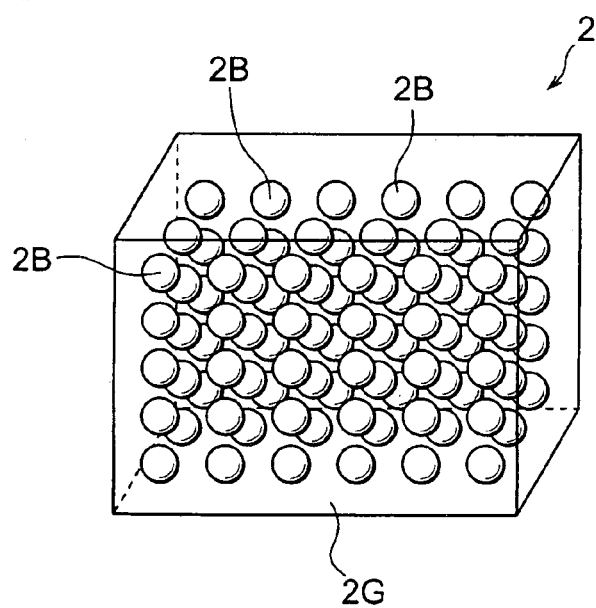
FIG. 2 is a perspective view showing an example of a photonic crystal.

Next, the plastic photonic crystal 2 is described. FIG. 2 is a perspective view showing an example of the photonic crystal 2. The photonic crystal 2 includes a plurality of fine balls (optical crystallite) 2B composed of silica or barium titanate, titanium oxide, gadolinium oxide or the like within a gel material 2G. This photonic crystal 2 is plastic and can be deformed with ease. The fine balls 2B are regularly and uniformly arranged within the material 2G with periodicity almost identical to the wavelength of the light.

The interval of the fine balls 2B is set, for example, about ½–¼ of the wavelength corresponding to a wavelength band of input light. According to this crystal structure, a photonic band structure is generated within the photonic crystal 2. In addition, since the gel is deformed by the external force with ease, the crystal structure of the photonic crystal 2, that is, its photonic band structure changes with ease. The wavelength of the light which passes through the photonic crystal 2 also changes similarly according to this change. Moreover, refractive indexes of the fine balls 2B and the material 2G are different, and in addition, both are transparent to a selected wavelength of light or have suitable transmittances.

For example, by using a material in which an ultraviolet ray cured resin is mixed as the sol material and irradiating the ultraviolet ray to this to make it gel, the gel material 2G described above can be obtained. A typical ultraviolet ray cured resin is made to mix a crosslinking agent and an optical polymerization initiator into an acryl amide, and a number of ultraviolet ray cured resins have been previously known. In addition, since the number of periodic structure of this fine ball 2B may be about 50, the photonic crystal 2 fully functions by an element of about 100 μm square at maximum.

Figure 3A:
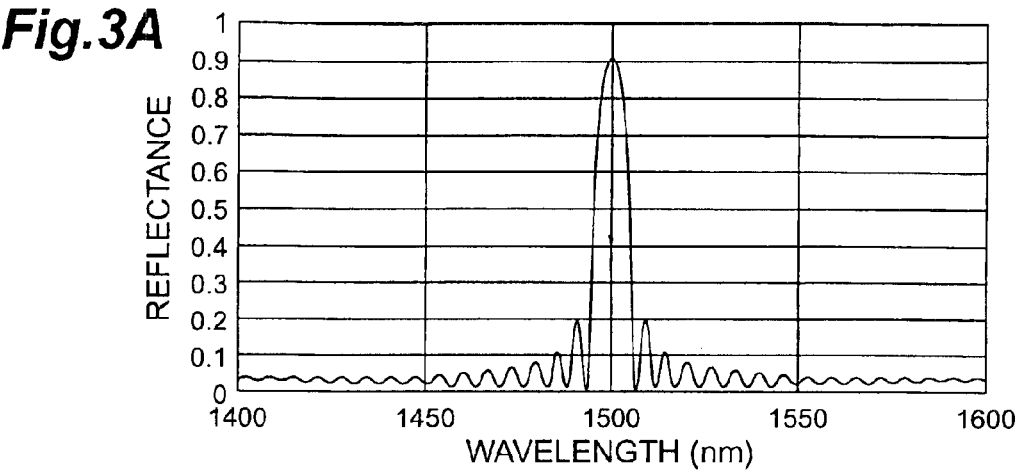
FIGS. 3A, 3B, and 3C are graphs which show wavelength (nm) dependability of a reflectance (arbitrary constant) of light in a single-dimensional photonic crystal (multilayer film structure)
Figure 3B:
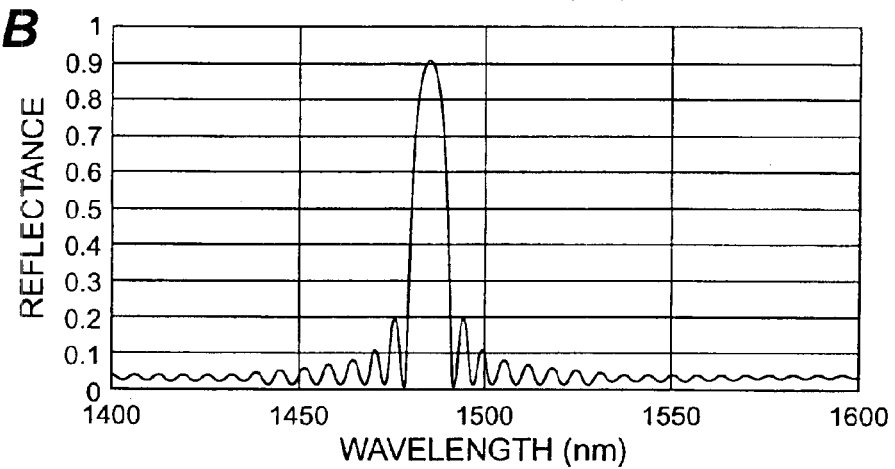
Figure 3C:
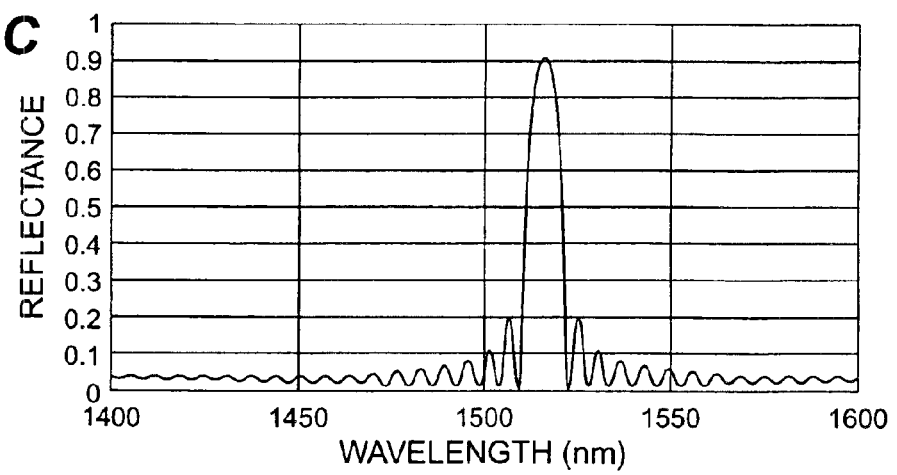

Next, variability of wavelength selectivity in the photonic crystal is described. FIGS. 3A, 3B, and 3C are graphs which show wavelength (nm) dependability of a reflectance (arbitrary constant) of the light in the single-dimensional photonic crystal (multilayer film structure). FIG. 3A is a graph when not applying an external force to the photonic crystal by the piezo-electric element, FIG. 3B is a graph when applying a pressure (external force) in a compressing direction so that a lattice strain of 1% in the photonic crystal may be generated by the piezo-electric element, and in addition, FIG. 3C is a graph when applying a pressure in a spreading direction so that the lattice strain of 1% in the photonic crystal may be generated by the piezo-electric element.

According to these graphs, a peak of a reflective intensity, when the external force is not applied, is about a wavelength $\lambda_c$=1500 nm (FIG. 3A). In contrast to this, when a compressive strain of 1% is applied thereto, this wavelength $\lambda_c$ is shifted to a shorter wavelength side to become about 1470 nm (FIG. 3B), while when a spreading strain of 1% is applied thereto, the wavelength $\lambda_c$ is shifted to a longer wavelength side to become about 1530 nm (FIG. 3C).

That is, when introducing a slight lattice strain to the photonic crystal by the external force, the photonic band structure changes due to a change in the crystal structure within the crystal, thereby, the reflection property of the light may change. Accordingly, the external force applied to the photonic crystal 2 can make the wavelength of the light, which is transmitted to the optical fiber 8 from the optical fiber 7, variable. Moreover, FIG. 3 is an example where a light transmission property to the single-dimensional photonic crystal structure such as a mirror of a multilayer film structure is calculated. However, also in the three-dimensional crystal structure where the crystallites are completely arranged in the same interval, a similar light transmission property is shown in a specific crystal orientation.

[First Embodiment]

Figure 4:
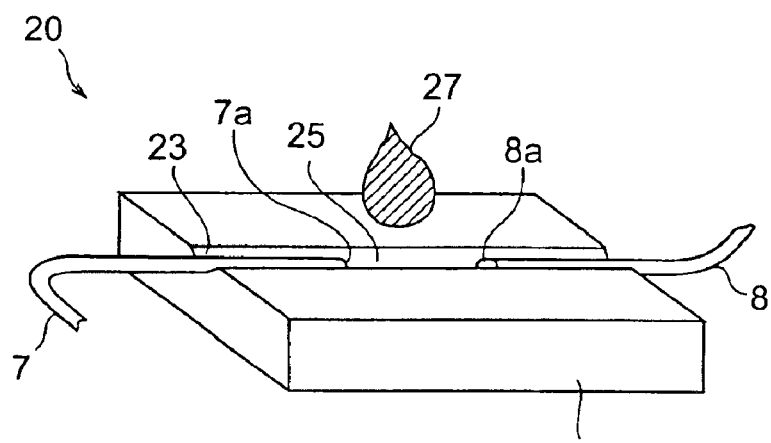
FIG. 4 is a first process chart of a first embodiment according to the present invention.
Figure 5:
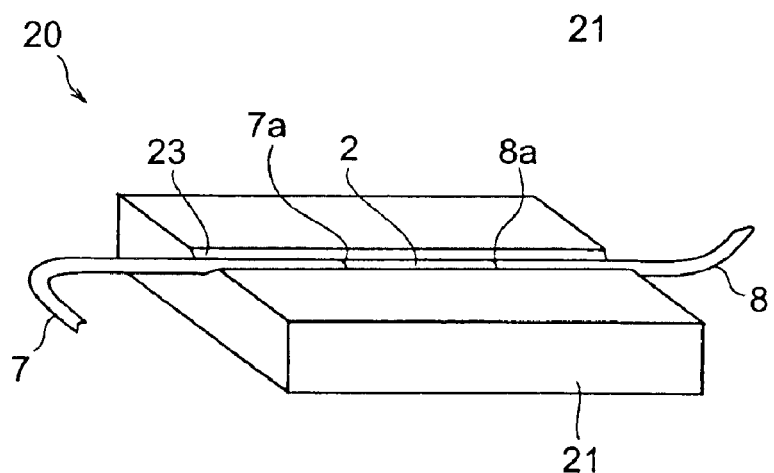
FIG. 5 is a second process chart of the first embodiment according to the present invention.

A first embodiment of the present invention is described. FIG. 4 and FIG. 5 are process charts of the first embodiment. As shown in FIG. 4, a V-groove connector 20 includes a thick plate-shaped base 21, and a V-groove 23 is formed on an upper surface of the base 21. The V-groove 23 is straightly extended in a longitudinal direction of the base 21. The optical fibers 7 and 8 are arranged in the V-groove 23. The end face 7a of the optical fiber 7 and the end face 8a of the optical fiber 8 are opposed at a predetermined distance. Here, a predetermined distance is about 20 to 80 μm, when the wavelength of the light used is 1.55 μm. A space section 25 is formed by the end face 7a, the end face 8a, and the V-groove 23. Each of end faces 7a and 8a is an end face which will become at least either an incident plane or an emitting plane of the light.

A solution 27 suspends particles 43, such as a silica particle with a grain size of about 120 nm or a polystyrene particle with a grain size of about 150 nm, in ultra pure water at a volume rate of 1 to 4% in concentration. By dropping this solution 27, into the space section 25, the space section 25 is filled with the solution 27. The solution 27 is dropped into the space section 25 by a predetermined volume and at a predetermined rate. In addition, an ion concentration or the like of the solution 27 has been chemically adjusted by dissolving sodium hydroxide by about 1 micro-mol therein. The solution 27 of the space section 25 is then left for only a predetermined time period under a clean condition. Thereby, the particles are automatically arranged by electric charges which the particles have, and growth of the photonic crystal is generated by making each of the end faces 7a and 8a as a starting surface. By the progress of this crystal growth, as shown in FIG. 5, the photonic crystal 2 connected to each of the end faces 7a and 8a is formed in the space section 25. The solution 27 includes a component which is cured by ultraviolet curing, and by irradiating the ultraviolet ray to the solution 27 in the space section 25, the photonic crystal 2 becomes a gel. Thereby, the optical control section, which includes the semi-solidified photonic crystal 2 with plasticity, can be obtained. The photonic crystal 2 functions as the optical control section which controls at least either the light inputted into or the light emitted from each of the optical fibers 7 and 8.

The growth of the photonic crystal herein is considered as follows. According to conventional growth experiments of the photonic crystal using the particles, it is known that if putting the particles into a glass container, pouring the solution, whose ionic concentration or the like has been controlled, into the glass container, and leaving it for about 10 minutes to one month at the longest after fully dispersing them, the particles are charged and are uniformly arranged in the space by coulomb repulsion. Then, it is known that a boundary condition between the glass surface and the solution determines a growth direction in that case. It is considered that the growth of the photonic crystal of this embodiment is based on these facts. Moreover, although not shown here, in order to prevent the particles from condensation when dropping the solution 27 into the space section 25, equipment which applies vibration with a predetermined frequency to each of end faces 7a and 8a can also be used. Here, a predetermined frequency is 38–45 KHz. In addition, after completely dispersing the particles in the solution 27 by applying a frequency of 38–45 KHz, the particles may be further dispersed by vibration with a frequency of about 10 Hz. Thereby, after dispersing the particles in the solution 27, the photonic crystal 2 can be grown on each of the end faces 7a and 8a.

Figure 6:
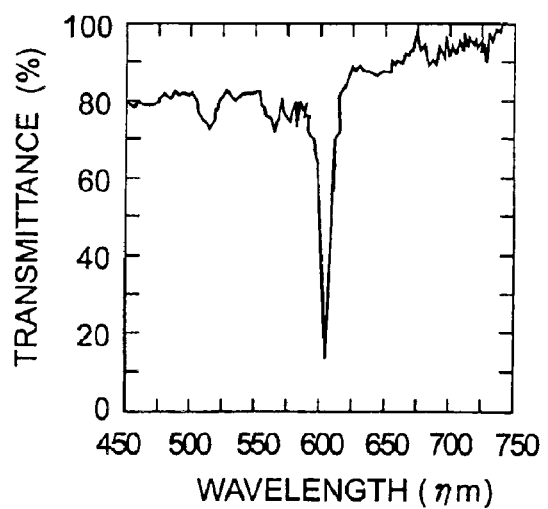
FIG. 6 is a graph which shows an example of an optical property of a photonic crystal naturally grown using this embodiment.

The present inventor has naturally grown the photonic crystal on the end face of one optical fiber array using this embodiment. An example of the optical property of this photonic crystal is shown in the graph of FIG. 6. In FIG. 6, the horizontal axis represents the wavelength of the light, and the vertical axis represents the transmittance of the light. According to this photonic crystal, a wavelength component with 600 nm among the lights can be selectively cut. Accordingly, the photonic crystal 2 can be used as the optical control section which has, for example, a function for wavelength selections. By mounting the piezo-electric element on the photonic crystal 2, and connecting the driving power supply to the piezo-electric element shown in FIG. 5, a device identical to the device shown in FIG. 1 can be made.

Figure 7:
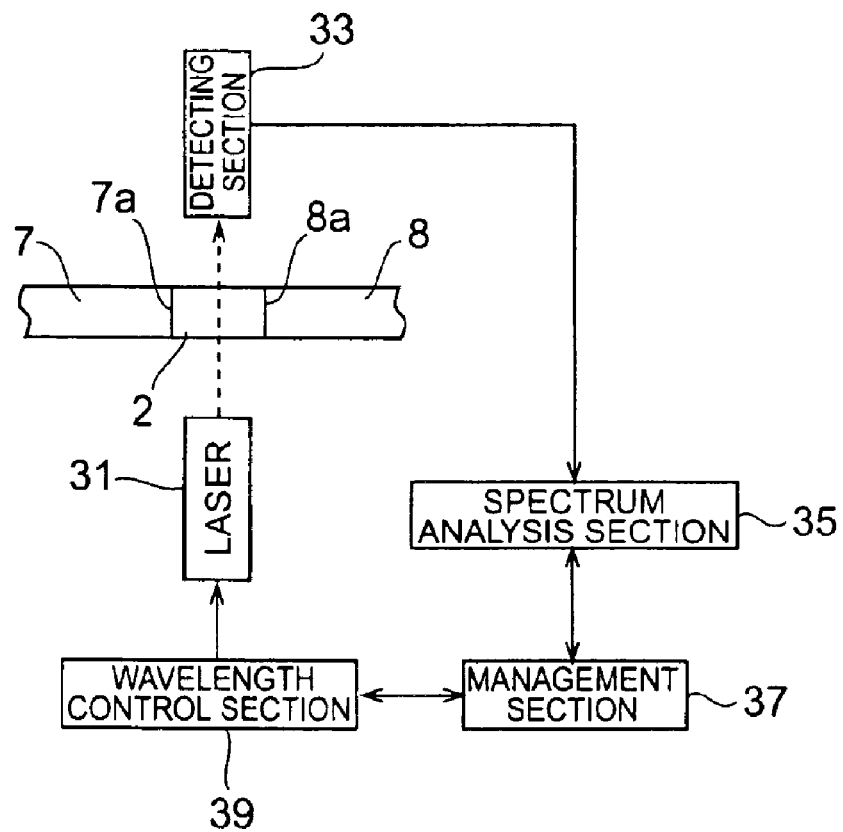
FIG. 7 is a block diagram for measuring an optical property of a photonic crystal in the process where the photonic crystal has been grown on an end face.
Figure 8:
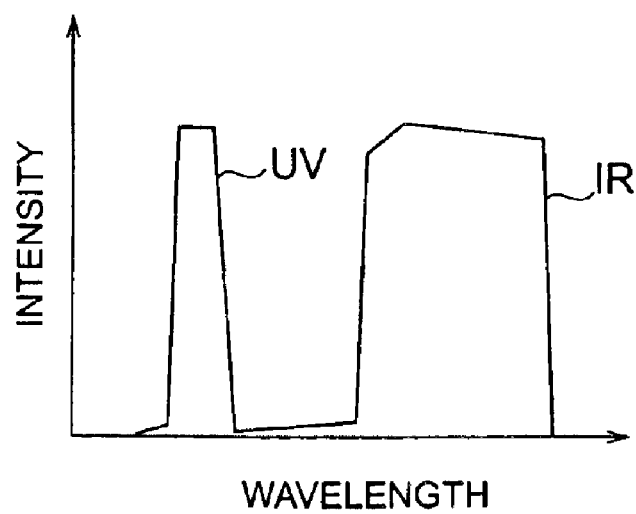
FIG. 8 is a graph showing each of a wavelength component IR of an infrared ray passed through a photonic crystal, and a wavelength component UV of an ultraviolet ray used for gelation of a solution.

Now, in the process of growing the photonic crystal 2 on each of the end faces 7a and 8a, the optical property (for example, wavelength transparency, reflection property) of the photonic crystal 2 can be measured in real time. FIG. 7 is a block diagram for performing this measurement. As shown in FIG. 7, the light which is emitted from a laser 31 (A lamp may be used instead of laser.) is applied to the photonic crystal 2. A wavelength component which has passed through the photonic crystal 2 among the emitted lights is detected by a detecting section 33. Data of the detected wavelength component is sent to a spectrum analysis section 35. The wavelength component which has passed through the photonic crystal 2 is analyzed by the spectrum analysis section 35. Thereby, the optical property of the photonic crystal 2 is measured in real time. This analysis data is sent to a management section 37 which consists of, for example, a personal computer, and is displayed on a display of the management section 37. Thereby, the optical property of the photonic crystal 2 can be monitored in real time. The predetermined optical property mentioned here may be, for example, a property which passes through an infrared wavelength component. When it is judged that the photonic crystal 2 has the predetermined optical property by the management section 37, the management section 37 sends a signal of wavelength change to a wavelength control section 39. Based on this signal, the wavelength control section 39 changes the wavelength of the laser 31, and emits a wavelength component of the ultraviolet ray. Thereby, this makes it possible to make the solution 27 gel and to form the optical control section, which consists of the semi-solidified photonic crystal 2 with plasticity, on the end faces 7a and 8a of the optical fibers 7 and 8. Furthermore, each of a wavelength component IR of the infrared ray passed through the photonic crystal 2 and a wavelength component UV of the ultraviolet ray used for gelation of the solution 27 is shown in the graph of FIG. 8. The vertical axis represents intensity of the wavelength component and the horizontal axis represents wavelength. Measurement of the optical property and curing by the ultraviolet ray described above can also be applicable to the embodiments described later.

According to the first embodiment, as compared to a method for arranging the photonic crystal used as the optical control section on the end face of the optical fiber using lithography, expensive equipment for manufacturing the photonic crystal is not required, and a significant amount of time for manufacturing the photonic crystal is not required. In addition, according to the first embodiment, use of technical skills for cutting out the photonic crystal is not required. Based on above reasons, according to the first embodiment, the optical control section 3 including the photonic crystal 2 is made with ease. In addition, in order that the photonic crystal 2 may satisfy the optical property with about 10 times the wavelength in size, the size of the photonic crystal 2 becomes approximately tens of micrometers. Accordingly, since the optical control section 3 becomes compact, the optical control section 3 has very high consistency with the size of the optical fibers 7 and 8. These effects are also similar to those of the embodiments described below.

[Second Embodiment]

Figure 9:
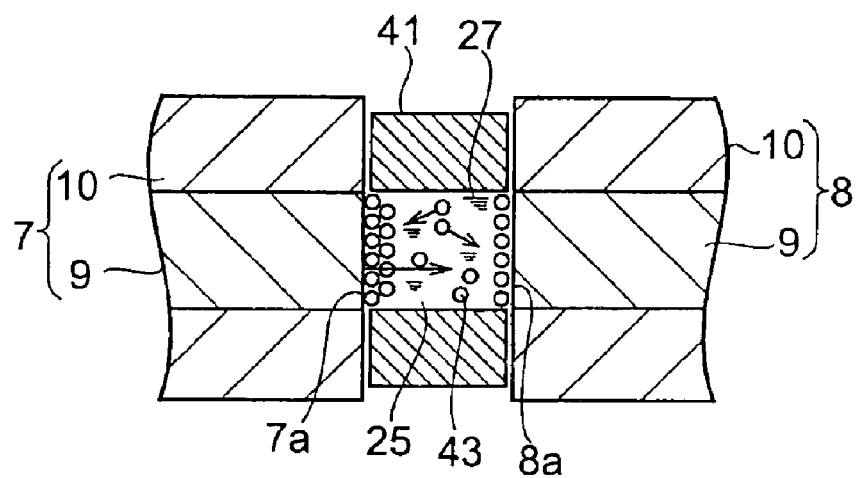
FIG. 9 is a sectional view of an optical fiber according to a second embodiment.

A second embodiment of the present invention is described focusing on a point which differs from the first embodiment. FIG. 9 is a sectional view of the optical fibers 7 and 8. The end face 7a of the optical fiber 7 and the end face 8a of the optical fiber 8 are arranged parallel with each other via a spacer 41. The spacer 41 contacts with the cladding layer 10 of the end face 7a, and the cladding layer 10 of the end face 8a. Thereby, the space section 25 can be formed.

The solution 27, which includes particles 43 used as the material of the photonic crystal and whose ion concentration or the like has been chemically adjusted, is prepared. The solution 27 is dropped into the space section 25 at a predetermined rate and by only a predetermined volume. The particles 43 are charged with static electricity by the solution 27. The amount of the electric charges of the static electricity can be adjusted by changing the ion concentration of the solution 27, PH or the like. Since the particles 43 repel one another by coulomb repulsion because of static electricity, the particles 43 may naturally come to be arranged so as to maintain a specific interval determined by its concentration. After the passing of a predetermined time period, the photonic crystal 2 as shown in FIG. 5 is formed in the space section 25 shown in FIG. 9, and between the core section 9 of the end face 7a and the core section 9 of the end face 8a. The core section 9 of the end face 7a and the core section 9 of the end face 8a are connected by this photonic crystal.

However, planes which contact the solution 27 among the core sections 9 of the optical fibers 7 and 8, and planes which contact the solution 27 among the spacer 41 give a boundary condition to a growth direction of natural growth, an arrangement interval or the like. As a result, a crystal orientation of the photonic crystal 2 or the like can be controlled by this boundary condition. The shape of the contacted plane described above, electrical characteristics, chemical properties or the like determine the boundary condition.

A general optical fiber is configured by doping a certain ion into a silica-based base material, such as quartz. Since a wavelength to be transmitted is determined by its electrical characteristics or the chemical properties, the type of base material or ion is limited to some extent. In addition, generally, the shape of the end face of the optical fiber is a concentric circle shape. In contrast to this, there is no restriction of the shape and material property in particular on the spacer 41. Accordingly, by setting the shape, the material property, and its surface treatment method of the spacer 41 as parameters, growth conditions of the photonic crystal 2 or the like become controllable.

Figure 10:
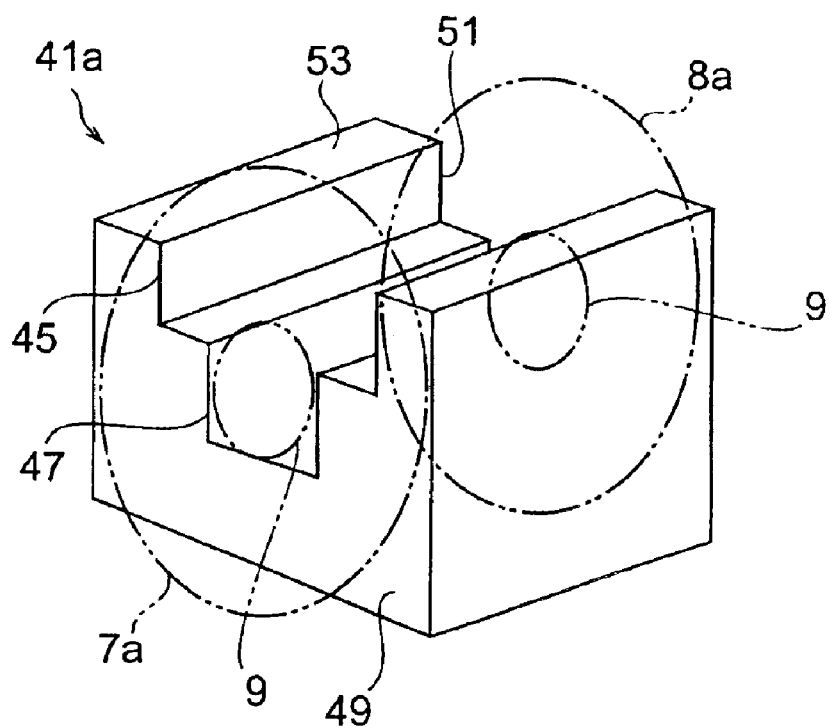
FIG. 10 is a perspective view showing a spacer according to the second embodiment.

Now, FIG. 10 is a perspective view showing a spacer 41a which is an example of the spacer 41. The spacer 41a has a structure with groove sections 45 and 47 in a rectangular parallelepiped. The groove section 45 is formed in an upper surface 53 of the rectangular parallelepiped from a side surface 49 to an opposing side surface 51 of the rectangular parallelepiped. The groove section 47 is formed at the bottom section of the groove section 45 from the side surface 49 to the side surface 51. The width of the groove section 47 is smaller than the width of the groove section 45. The end face 7a of the optical fiber 7 is aligned to the side surface 49, and the end face 8a of the optical fiber 8 is aligned to the side surface 51, respectively. Among two ends of the groove section 47, the core section 9 of the end face 7a corresponds to one end, and the core section 9 of the end face 8a corresponds to the other end section.

The photonic crystal 2 is formed in the groove section 47 by the method of this embodiment. The piezo-electric element 4 which applies the external force to the photonic crystal 2 is then arranged at the groove section 45. According to the spacer 41a, while specifying an interval between the end face 7a of the optical fiber 7 and the end face 8a of the optical fiber 8, the solution 27 is also easy to be dropped, and storage of the solution 27 is achievable. However, although a shape of the spacer 41 is not limited to the shape shown in FIG. 10, when taking into consideration the arrangement of other members, such as the piezo-electric element 4, a shape where the upper part thereof is widely opened as shown in FIG. 10 is preferable.

As described above, according to the spacer 41, it becomes possible to arrange the end faces 7a and 8a with high accuracy, and to control the growth direction of the photonic crystal 2 with desirable accuracy.

[Third Embodiment]

Figure 11:
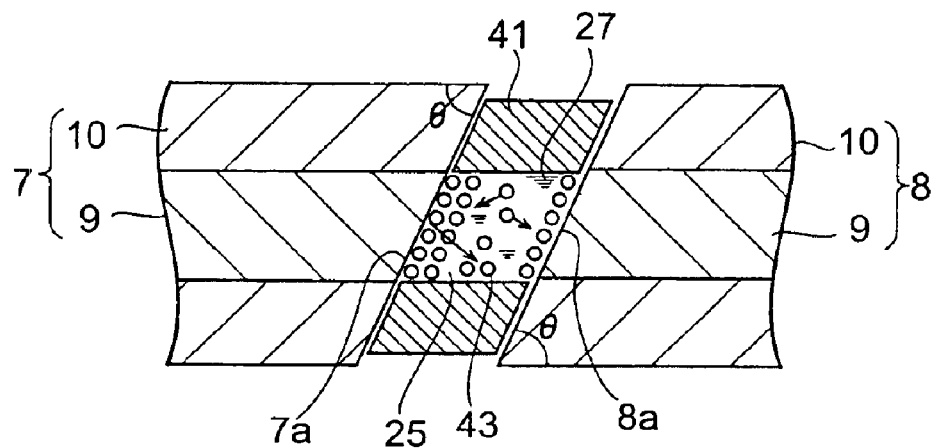
FIG. 11 is a sectional view of an optical fiber according to a third embodiment.

A third embodiment of the present invention is described focusing on a point which differs from the first and the second embodiments. FIG. 11 is a sectional view of the optical fibers 7 and 8. The end face 7a of the optical fiber 7 and the end face 8a of the optical fiber 8 are arranged parallel with each other via the spacer 41. The end faces 7a and 8a are inclined by a predetermined angle θ less than 90 degrees to a longitudinal direction of the optical fibers 7 and 8. By polishing the end faces 7a and 8a, inclinations of the end faces 7a and 8a can be formed. Moreover, these angles of the second embodiment shown in FIG. 9 are 90 degrees.

For example, if the solution 27 whose concentration of the particles 43 is the same as that of solution 27 of FIG. 9 is used in the case of FIG. 11, according to the inclinations of the end faces 7a and 8a of FIG. 11, a growth axis of the photonic crystal which grows on the end faces 7a and 8a generates an inclination different from a growth axis of the photonic crystal which grows on the end faces 7a and 8a of FIG. 9. As a result, between an optical transmission mode in the optical fibers 7 and 8, and an optical transmission mode inside the photonic crystal, a coupling relationship, which is controlled by an inclination of the growth axis, namely, a crystal angle, is realized. Accordingly, by changing the inclinations of the polishing surfaces of the end faces 7a and 8a, the particle concentration of the solution 27 or the like, it becomes possible to control the optical property (for example wavelength transparency, reflection property) in the whole optical device including the optical fibers 7 and 8 or the like.

Moreover, although an example, in which the end faces 7a and 8a of the optical fibers 7 and 8 are arranged so as to become parallel with each other, is shown in FIG. 9 and FIG. 11, taking into the consideration the optical transmission property of the photonic crystal, the end faces 7a and 8a may not be parallel with each other. It is also possible to change the arrangement of the end faces 7a and 8a after analyzing the properties of the photonic crystal.

[Fourth Embodiment]

Figure 12:
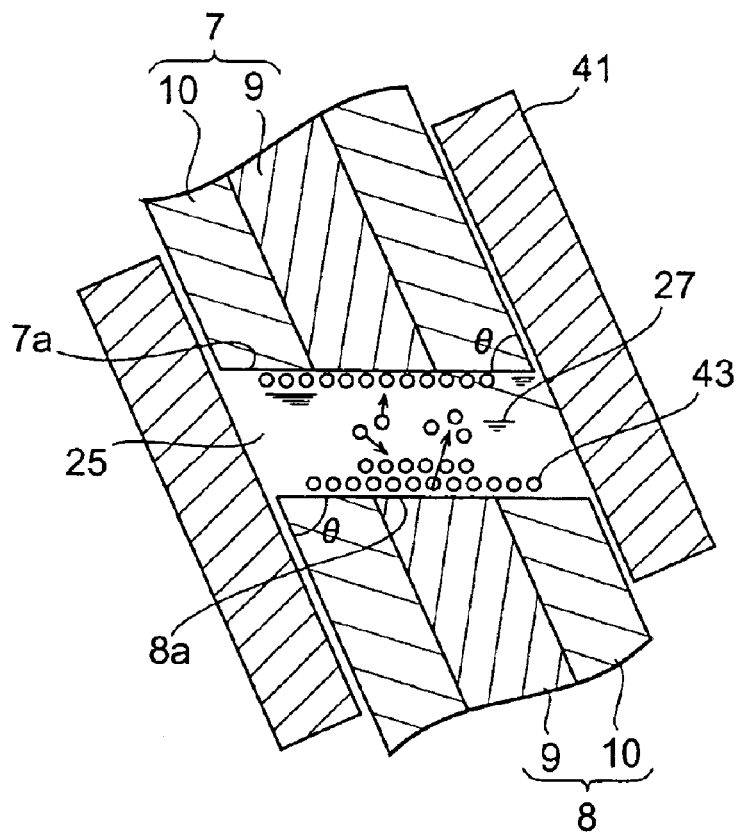
FIG. 12 is a sectional view of an optical fiber according to a fourth embodiment.

A fourth embodiment of the present invention is described focusing on a point which differs from the first to the third embodiments. FIG. 12 is a sectional view of the optical fibers 7 and 8. In the fourth embodiment, as for the optical fibers 7 and 8 shown in FIG. 11, the end face 7a is arranged so as to be above the end face 8a in a perpendicular direction. The end faces 7a and 8a are horizontally positioned. The spacer 41 is arranged so that it may face across edges of the optical fibers 7 and 8. The space section 25 is also formed between the cladding layer 10 of the end face 7a and the cladding layer 10 of the end face 8a. Accordingly, the photonic crystal is also formed between the cladding layer 10 of the end face 7a and the cladding layer 10 of the end face 8a other than between the core section 9 of the end face 7a and the core section 9 of the end face 8a.

In the growth of the photonic crystal, there is a case where it may be more effective to also take gravity into consideration other than a boundary condition and conditions of the solution 27. Accordingly, in the fourth embodiment, by arranging the end faces 7a and 8a so as to become perpendicular to a gravity direction, the photonic crystal is grown. According to a balance between gravity which acts on the particles 43, and the electrostatic force of the mutual particles 43, at least either of the growth direction or the growth rate of the photonic crystal 2, which grows on the end faces 7a and 8a, is controlled. If a particle whose specific gravity is heavier is used as the particle 43, for example, gadolinium oxide, titanium oxide, barium titanate, or the like is used, the effect of gravity cannot be ignored. As shown in FIG. 12, in the growth of the photonic crystal 2, a growth from a lower boundary surface, that is, a boundary surface between the end face 8a and the solution 27 becomes major.

[Fifth Embodiment]

Figure 13A:
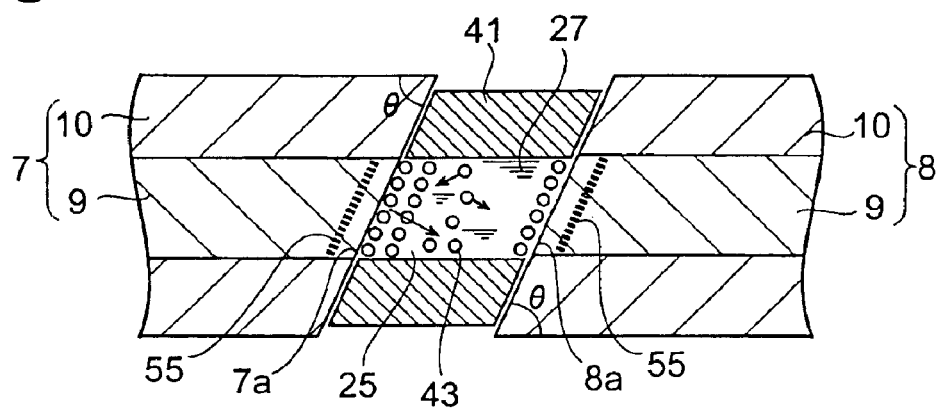
FIG. 13A and FIG. 13B are sectional views of an optical fiber according to a fifth embodiment.
Figure 13B:
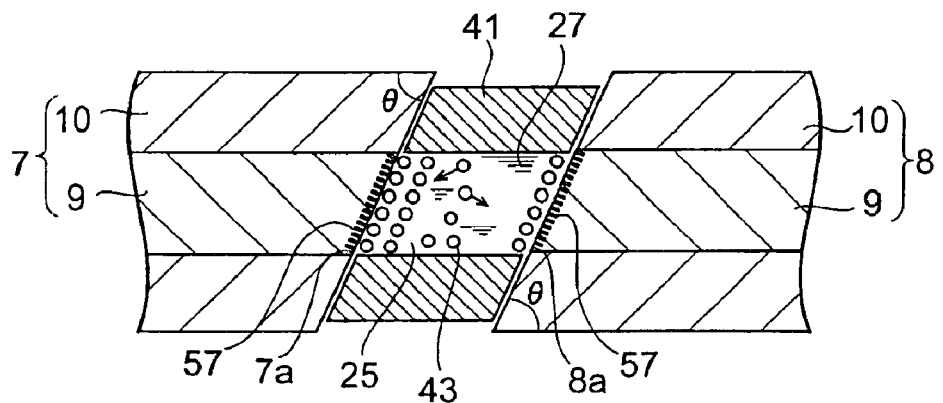

A fifth embodiment of the present invention is described focusing on a point which differs from the first to the fourth embodiments. FIG. 13A and FIG. 13B are sectional views of the optical fibers 7 and 8. A point of difference between the optical fibers 7 and 8 shown in FIG. 13A and the optical fibers 7 and 8 shown in FIG. 11 is that an electric charge layer 55 is formed in the vicinity of the core section 9 of each of the end faces 7a and 8a. The electric charge layer 55 can be formed, for example, by implanting ions into the core section 9 via the end faces 7a and 8a. By controlling a surface charge density of the end faces 7a and 8a using the electric charge layer 55 formed beforehand, the photonic crystal can be grown stably.

A point of difference between the optical fibers 7 and 8 shown in FIG. 13B and the optical fibers 7 and 8 shown in FIG. 11 is that a fine structure layer 57 is formed in the core section 9 of each of the end faces 7a and 8a. The fine structure layer 57 has a spatial structure which includes concave and convex sections with nearly identical sizes as the particles 43. By using the fine structure layer 57 formed beforehand, the photonic crystal can be grown stably.

[Sixth Embodiment]

Figure 14A:
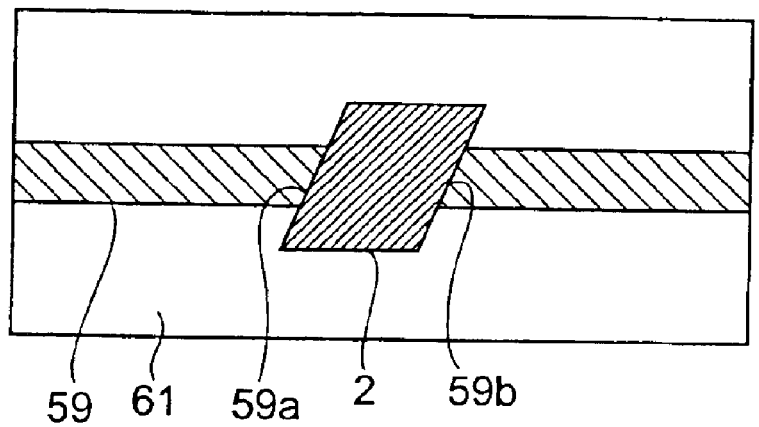
FIG. 14A and FIG. 14B are plan views of an optical waveguide according to a sixth embodiment.
Figure 14B:
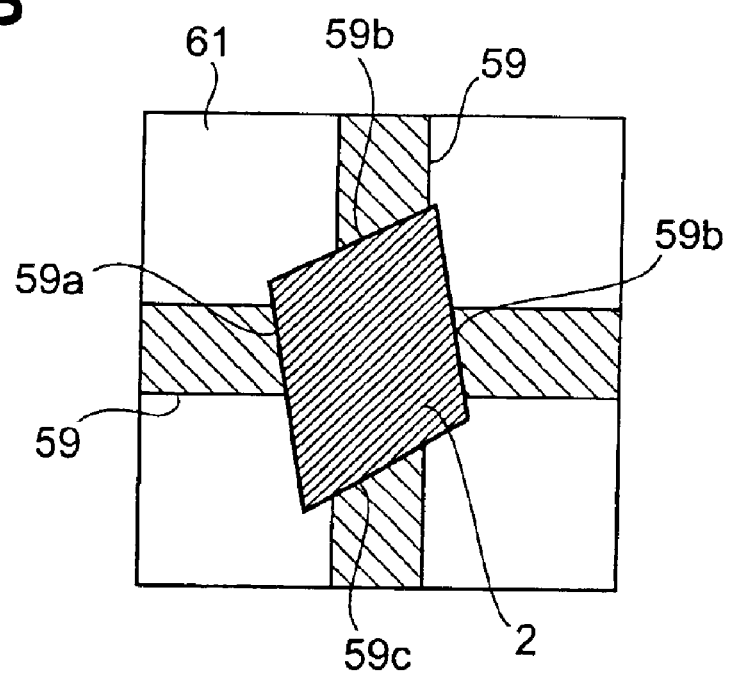

A sixth embodiment of the present invention is described focusing on a point which differs from the first to the fifth embodiments. FIG. 14A and FIG. 14B are plan view of a light confinement-type optical wave guide according to the sixth embodiment.

As shown in FIG. 14A, a single-dimensional optical waveguide 59 is formed on a substrate 61. A hole with a suitable shape is formed in a predetermined place of the optical waveguide 59 so that the optical waveguide 59 may be divided into two. An end face 59a of one divided optical waveguide 59 and an end face 59b of the other divided optical waveguide 59 are positioned in this hole. In the sixth embodiment, the shape of this hole is a rough rhombus. Among sides which configure the rough rhombus, two sides which divide the optical waveguide 59 have predetermined inclinations to a direction where an optical waveguide 59 is extended. By dropping the solution 27 into this hole, the photonic crystal 2 is grown from the end faces 59a and 59b, and the hole is filled with the photonic crystal 2. As the optical waveguide 59, there are optical waveguides which use lithium niobic acid, optical waveguides in which ions are implanted to a glass, or the like.

As shown in FIG. 14B, the optical waveguide 59 is formed on the substrate 61 in the shape of a cross. A hole is formed in a place including a crossing point of the cross shape. End faces 59a, 59b, 59c, and 59d of the optical waveguide 59 which is divided into four are positioned in this hole. By dropping the solution 27 into this hole, the photonic crystal 2 is grown from the end faces 59a, 59b, 59c, and 59d, and the hole is filled with the photonic crystal 2. In this structure, the photonic crystal 2 is grown at different growth angles for two different waveguides. Of course, it is necessary to optimize those two angles in the range where the structure of the photonic crystal does not break. In the case of a device shown in FIG. 14B, in particular, it is important to grow the photonic crystal 2 while monitoring the optical property of the photonic crystal. It is considered that, by suitably growing the photonic crystal 2 in the crossing section of the optical waveguide 59 as shown in FIG. 14B, it becomes possible to make the light, which transmits between the respective optical waveguides, switch.

INDUSTRIAL APPLICABILITY

According to the present invention, by putting the solution including the particles into the space section, and growing the photonic crystal on the end face of the optical transmission line, the optical control section is formed on the end face. Therefore, according to the present invention, the photonic crystal used as the optical control section can be made on the end face of the optical transmission line with ease.

What is claimed is:

1. A method for forming an optical control section, which controls at least either light inputted into or light emitted from an optical transmission line, on said optical transmission line including an end face which becomes at least either an incident plane or an emitting plane of the light, wherein said optical control section including a photonic crystal is formed on said end face, by putting a solution including particles used as a material of said photonic crystal into a space section in which said end face is positioned, and growing said photonic crystal on said end face.

2. The method for forming the optical control section according to claim 1, wherein while growing said photonic crystal on said end face, an optical property of said photonic crystal is measured.

3. The method for forming the optical control section according to claim 2, wherein when it is judged that said photonic crystal has a predetermined optical property based on said measurement, said optical control section semi-solidified with plasticity is formed on said end face by irradiating light with a predetermined wavelength to said solution and making said solution gel.

4. The method for forming the optical control section according to claim 1, wherein said optical control section semi-solidified with plasticity is formed on said end face by making said solution gel.

5. The method for forming the optical control section according to claim 1, wherein said photonic crystal is grown on said end face by leaving said solution in said space section to make said particles arrange naturally.

6. The method for forming the optical control section according to claim 1, wherein at least either a growth direction or a growth rate of said photonic crystal, which is grown on said end face, is controlled by charging static electricity to said particles in said solution, and by a balance between gravity which acts to said particles and an electrostatic force between said particles.

7. The method for forming the optical control section according to claim 1, wherein at least either on said end face or in said optical transmission line in its vicinity, at least either an electric charge layer or a fine structure layer for having said photonic crystal grown stably is formed.

8. The method for forming the optical control section according to claim 1, wherein said photonic crystal is grown on said end face after dispersing said particles by applying vibration to said end face when putting said solution into said space section.

9. The method for forming the optical control section according to claim 1, wherein by forming said space section by arranging said end face of said optical transmission line and an end face of the other optical transmission line parallel to each other, and growing said photonic crystal on said end face of said other optical transmission line in addition to said end face of said optical transmission line, said photonic crystal, which connects said end face of said other optical transmission line to said end face of said optical transmission line, is formed.

10. The method for forming the optical control section according to claim 9, wherein said photonic crystal is made to have a predetermined optical property by inclining said end face of said optical transmission line to an optical axis of said optical transmission line and inclining said end face of said other optical transmission line to an optical axis of said other optical transmission line, and making a growth axis of said photonic crystal to be at a predetermined angle to each of said optical axes.

11. The method for forming the optical control section according to claim 9, wherein said solution is put into said space section after arranging a spacer which specifies said space section.

12. The optical control section formed by the method according to claim 1.

* * * * *